United States Patent
Huang et al.

(10) Patent No.: US 8,051,956 B2
(45) Date of Patent: Nov. 8, 2011

(54) DRIVING DEVICE FOR A PARKING BRAKE SYSTEM

(75) Inventors: Chien-Tai Huang, Changhua Hsien (TW); Chien-Tzu Chen, Taichung (TW); Shou-Ti Cheng, Changhua (TW); Bo-Ruei Chen, Tainan (TW); Ming-Hu Huang, Taichung Hsien (TW)

(73) Assignee: Automotive Research & Testing Center, Changhua Hsien (TW)

( * ) Notice: Subject to any disclaimer, the term of this patent is extended or adjusted under 35 U.S.C. 154(b) by 726 days.

(21) Appl. No.: 12/156,582

(22) Filed: Jun. 3, 2008

(65) Prior Publication Data
US 2009/0294226 A1  Dec. 3, 2009

(51) Int. Cl.
*F16D 65/14* (2006.01)
*F16C 1/26* (2006.01)

(52) U.S. Cl. ..... 188/2 D; 188/265; 188/158; 74/473.12; 74/502.6

(58) Field of Classification Search .................. 188/2 D, 188/265, 156, 157, 158, 161, 162; 74/500.5, 74/502.4, 502.5, 502.6
See application file for complete search history.

(56) References Cited

U.S. PATENT DOCUMENTS

| | | | | |
|---|---|---|---|---|
| 4,865,165 A * | 9/1989 | Taig | ............................... | 188/156 |
| 6,619,459 B2 * | 9/2003 | Gudlin | ........................... | 188/156 |
| 7,207,238 B2 * | 4/2007 | Feng | ............................. | 188/2 D |

* cited by examiner

*Primary Examiner* — Thomas J Williams
(74) *Attorney, Agent, or Firm* — William E. Pelton, Esq.; Cooper & Dunham LLP (57) ABSTRACT

A driving device for a parking brake system includes a casing shift member, a brake cable and a driving member. The casing shift member includes a cable casing. The brake cable is mounted through the cable casing. The driving member has a driving unit connected to and driving the casing shift member to perform a longitudinal motion. Thus the cable casing applies a force on the brake cable so as to perform a brake work. Because the brake cable is tightened with the force provided by the cable casing, the brake cable is only bent slightly. Thus the curvature of the brake cable is small. That prevents the brake cable from being damaged and prolongs a life span of the brake cable. Moreover, a mechanical efficiency of the driving device is improved because the brake cable is tightened with the force provided by the cable casing.

9 Claims, 8 Drawing Sheets

DRIVING DEVICE FOR A PARKING BRAKE SYSTEM

BACKGROUND OF THE INVENTION

1. Field of Invention

The present invention relates to a parking brake system, and more particularly to a driving device for a parking brake system that is durable and efficient.

2. Description of the Related Art

A conventional mechanical parking brake system (i.e. hand brake) comprises a lever in a car. When a driver pulls the lever for parking a car, brake mechanisms of the car are actuated to prevent the car from moving. However, due to the lever of the conventional mechanical parking brake system occupies a space in the car it does not conform to an electronic trend of a modern automobile industry.

A conventional electronic parking brake system uses electronic controllers to control the driving device of the parking brake system, so users can use a button or the like to replace a lever for controlling the parking brake system. Conventional driving devices of an electronic parking brake system can be classed with a single cable type and a dual cable type according to the numbers of the brake cables. Like the US Publication No. US20060231352 disclosed a "Electronic Drive of a Parking Brake" and U.S. Pat. No. 6,533,082 patent disclosed a "Electric Parking Brake". Both are classed with the dual cable type. Nevertheless, the dual cable type driving device primarily has disadvantages as follows:

1. It has multiple connecting interfaces that increase manufacturing costs and assembling difficulty.

2. It must have a balancer inside.

A conventional driving device of the single cable type like US Publication No. US2007131494 disclosed a "Parking brake comprising a cable traction device". The patent mainly comprises two deflection rollers. The deflection rollers are arranged in such a manner that a connection line between rotational axis of the deflection rollers can be rotated with respect to a main driving axis line. Therefore, a brake cable can be tightened with an essentially equal force in opposite directions.

However, the conventional driving device of the single cable type has some problems needed to overcome, comprising that the brake cable is tightened regularly when the brake cable is substantially bent with two reversal deflections. Therefore, the brake cable is damaged easily and a life span of the brake cable is shortened. Additionally, because the brake cable is substantially bent, a mechanical efficiency is lowered.

To overcome the shortcomings, the present invention provides a driving device for a parking brake system to mitigate or obviate the aforementioned problems.

SUMMARY OF THE INVENTION

The primary objective of the present invention is to provide a driving device for a parking brake system that uses a single brake cable, which is especially suitable for an electronic parking brake system and can increase a life span and a mechanical efficiency of the electronic parking brake system.

A driving device for a parking brake system in accordance with the present invention comprises a casing shift member, a brake cable mounted through the casing shift member and a driving member. The casing shift member comprises at least one cable casing. The brake cable mounted through the cable casing. The driving member comprises a driving unit connected to and driving the casing shift member to perform a longitudinal motion. Thus the cable casing applies a force on the brake cable so as to perform the brake work. Because the brake cable is tightened with the force provided by the cable casing, the brake cable is only bent slightly. Thus the curvature of the brake cable in accordance with the present invention is smaller than the driving device of the prior art. That prevents the brake cable from being damaged easily and prolongs a life span of the brake cable. Moreover, a mechanical efficiency of the driving device is improved because the brake cable is tightened with the force provided by the cable casing so as to reduce the curvature of the brake cable.

Preferably, the driving device further comprises a housing. The casing shift member comprises a guide rod. The guide rod is mounted movably in the housing and connected to the cable casing.

Preferably, the guide rod has a protruding end. The casing shift member further comprises a guide tube connected to the housing and mounted around the protruding end of the guide rod.

Preferably, the casing shift member further comprises an inner threaded rod mounted rotatably in the housing and having an inner thread. The guide rod is mounted through the inner threaded rod and has an outer thread engaging with the inner thread of the inner threaded rod.

Preferably, the guide tube has a longitudinal slot. The casing shift member further comprises a slide sleeve mounted in the guide tube, fastened on the guide rod and one of the ends of the cable casing and having at least one guide pin mounted slidably in the longitudinal slot.

Preferably, the driving unit is a motor having an output shaft. The driving member further comprises a gear reduction unit connected to the output shaft of the motor and the inner threaded rod to keep a rotation rate of the inner threaded rod lower than that of the output shaft so as to raise the torque of the inner threaded rod.

Preferably, the gear reduction unit comprises a motor reduction gear, a first reduction shaft, a second reduction shaft and a screw rod reduction gear. The motor reduction gear is mounted securely on the output shaft. The first reduction shaft is mounted rotatably in the housing and has a first front gear and a first rear gear engaging with the motor reduction gear. The second reduction shaft is mounted rotatably in the housing and has a second front gear engaging the first front gear and a second rear gear. The screw rod reduction gear is mounted securely on the inner screw rod and engages the second rear gear.

Preferably, the casing shift member further comprises another cable casing mounted on the housing at a side opposite to the cable casing and mounted around the brake cable.

Other objectives, advantages and novel features of the invention will become more apparent from the following detailed description when taken in conjunction with the accompanying drawings.

DETAILED DESCRIPTION OF THE INVENTION

With reference to FIGS. 1, 2, 3 and 6, a driving device for a parking brake system in accordance with the present invention comprises a housing (10), a casing shift member (20), a brake cable (24) mounted through the casing shift member (20) and a driving member (30).

The housing (10) can be mounting in a car for fastening the driving device.

The casing shift member (20) comprises at least one cable casing (23)(27) and the brake cable (24) is mounted through the at least one cable casing (23)(27). The casing shift member (20) may comprise a guide rod (21), a guide tube (22), a first cable casing (23), an inner threaded rod (25), a slide sleeve (26) and a second cable casing (27). The guide rod (21) is mounted movably in the housing (10), is mounted around the brake cable (24) and has a protruding end (211) and an outer thread. The guide tube (22) is connected to the housing (10), is mounted around the protruding end (211) of the guide rod (21) and has a longitudinal slot (221). The guide tube (22) may be formed integrally on the housing (10) or be mounted on the housing (10) with fasteners. The first cable casing (23) is mounted around the brake cable (24) and has two ends. One of the ends is connected to the protruding end (211) of the guide rod (21) and the other end is fastened on a predetermined position outside the housing (10).

Figure 1:
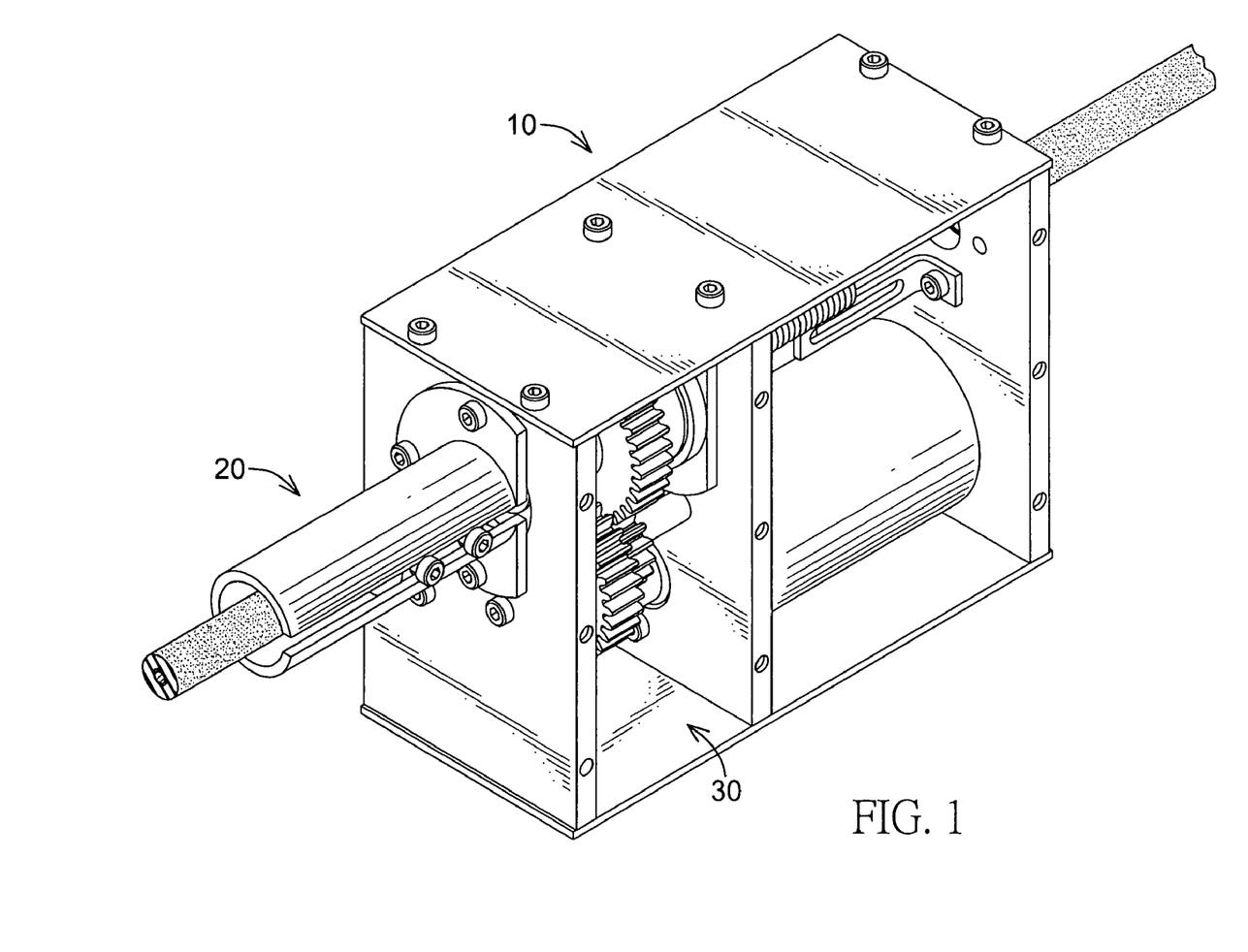
FIG. 1 is a perspective view of a driving device for a parking brake system in accordance with the present invention.
Figure 2:
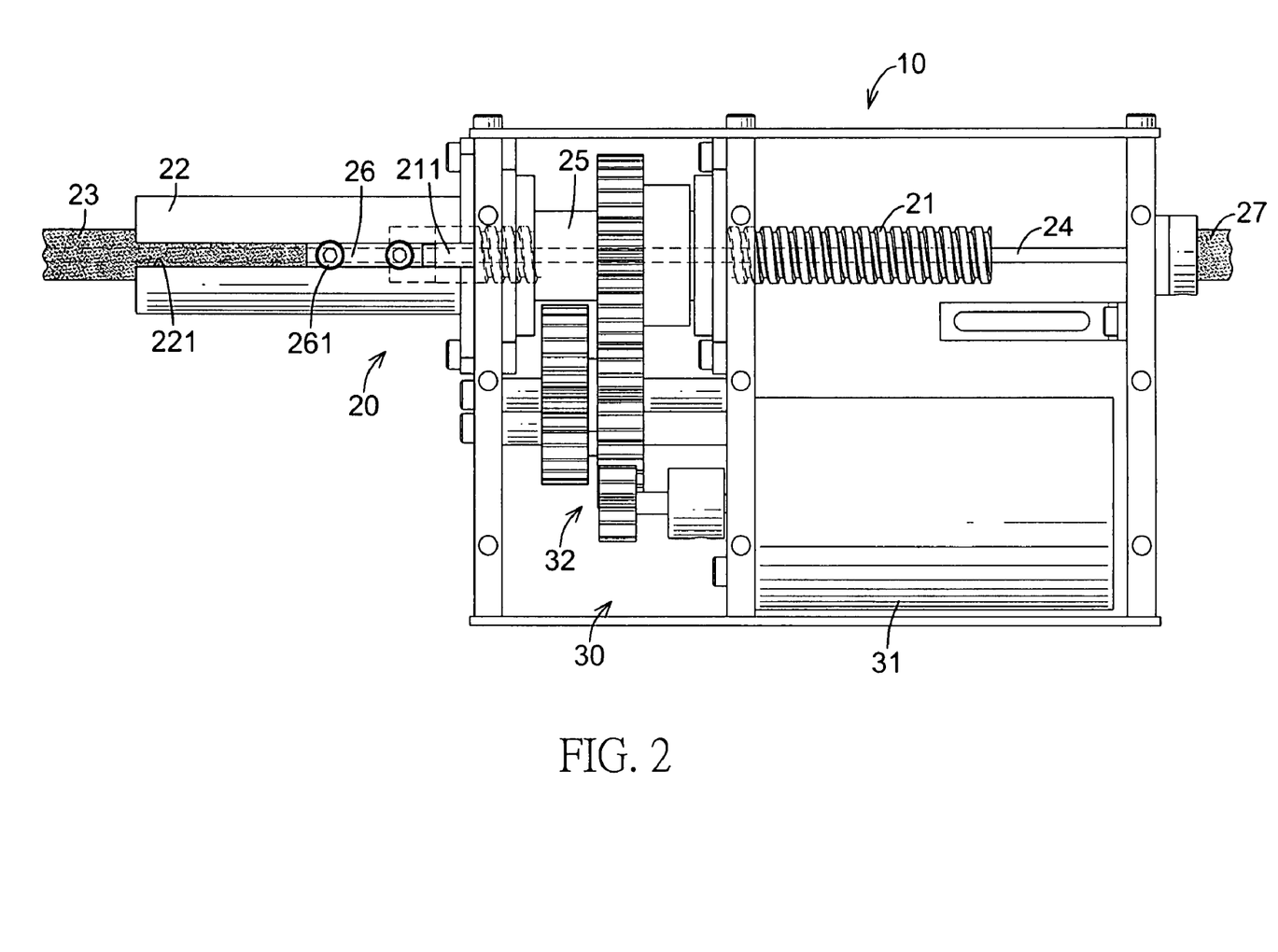
FIG. 2 is a side view of the driving device for a parking brake system in FIG. 1.
Figure 3:
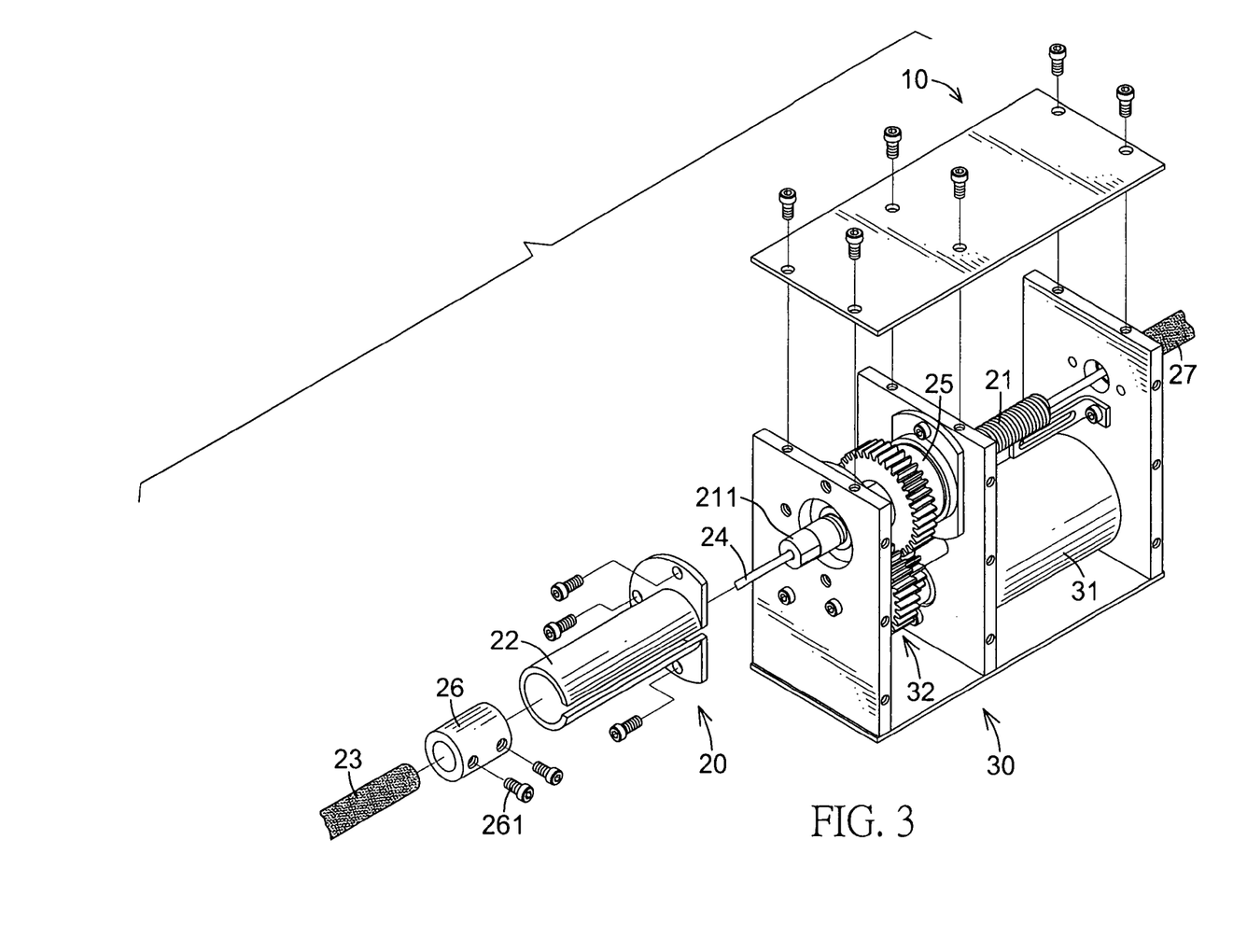
FIG. 3 is a partially exploded perspective view of the driving device for a parking brake system in FIG. 1.
Figure 4:
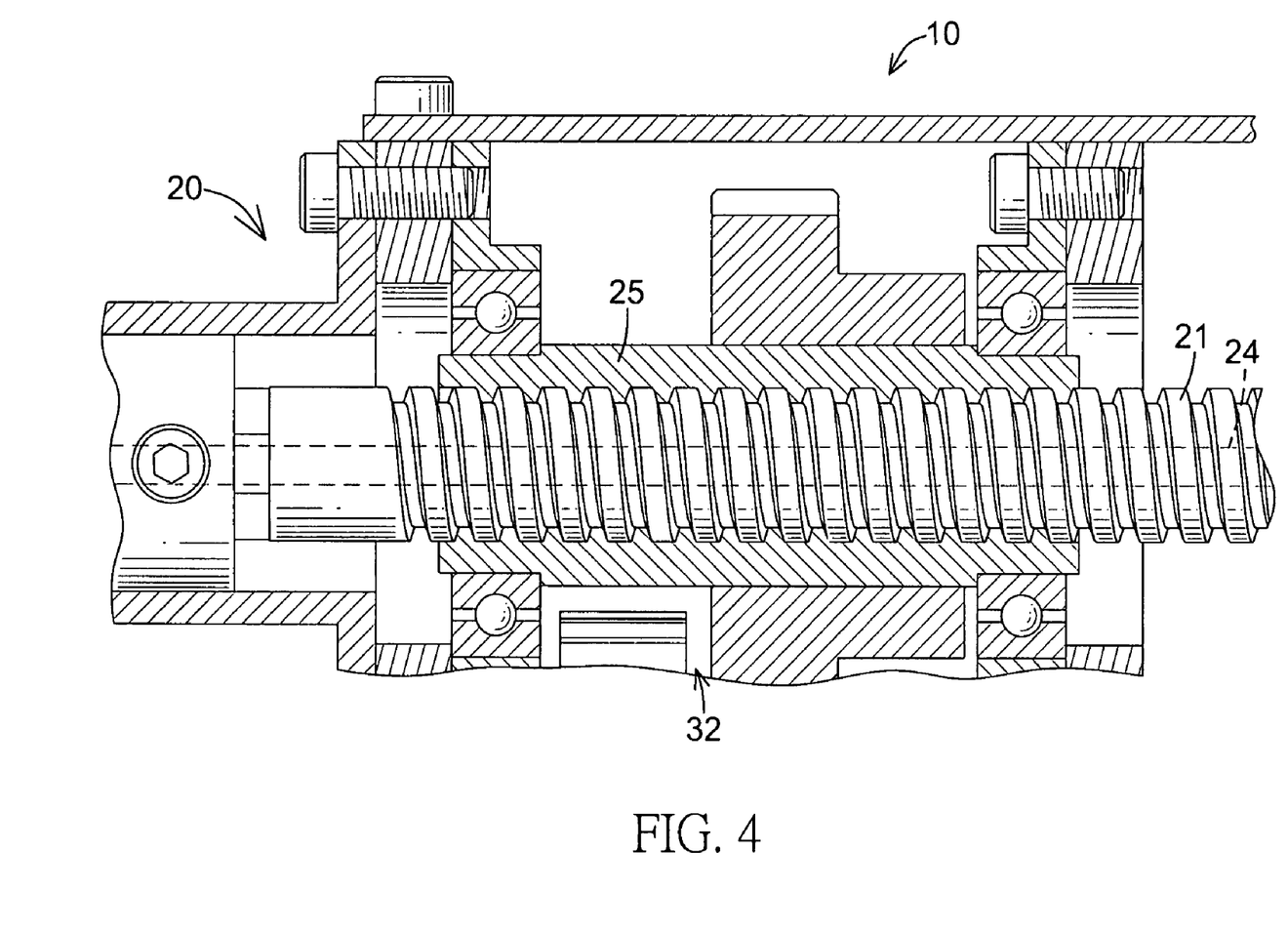
FIG. 4 is an enlarged side view in partial section of the driving device for a parking brake system in FIG. 1.

With further reference to FIG. 4, the inner threaded rod (25) is mounted rotatably in the housing (10) and has an inner thread engaging with the outer thread of the guide rod (21), i.e. the guide rod (21) is mounted through the inner threaded rod (25). The brake cable (24) may be connected to two brake mechanisms (40) and is mounted through the guide rod (21), the guide tube (22) and the first cable casing (23). The slide sleeve (26) is mounted in the guide tube (22), is fastened on the protruding end (211) of the guide rod (21) and one of the ends of the first cable casing (23) and has at least one guide pin (261). The slide sleeve (26) may be formed integrally on the guide rod (21). The at least one guide pin (261) is mounted slidably in the longitudinal slot (221) and limits the slide sleeve (26) to a longitudinal motion in the guide tube (22). The second cable casing (27) is mounted on the housing (10) at a side opposite to the first cable casing (23) and is mounted around the brake cable (24).

Figure 5:
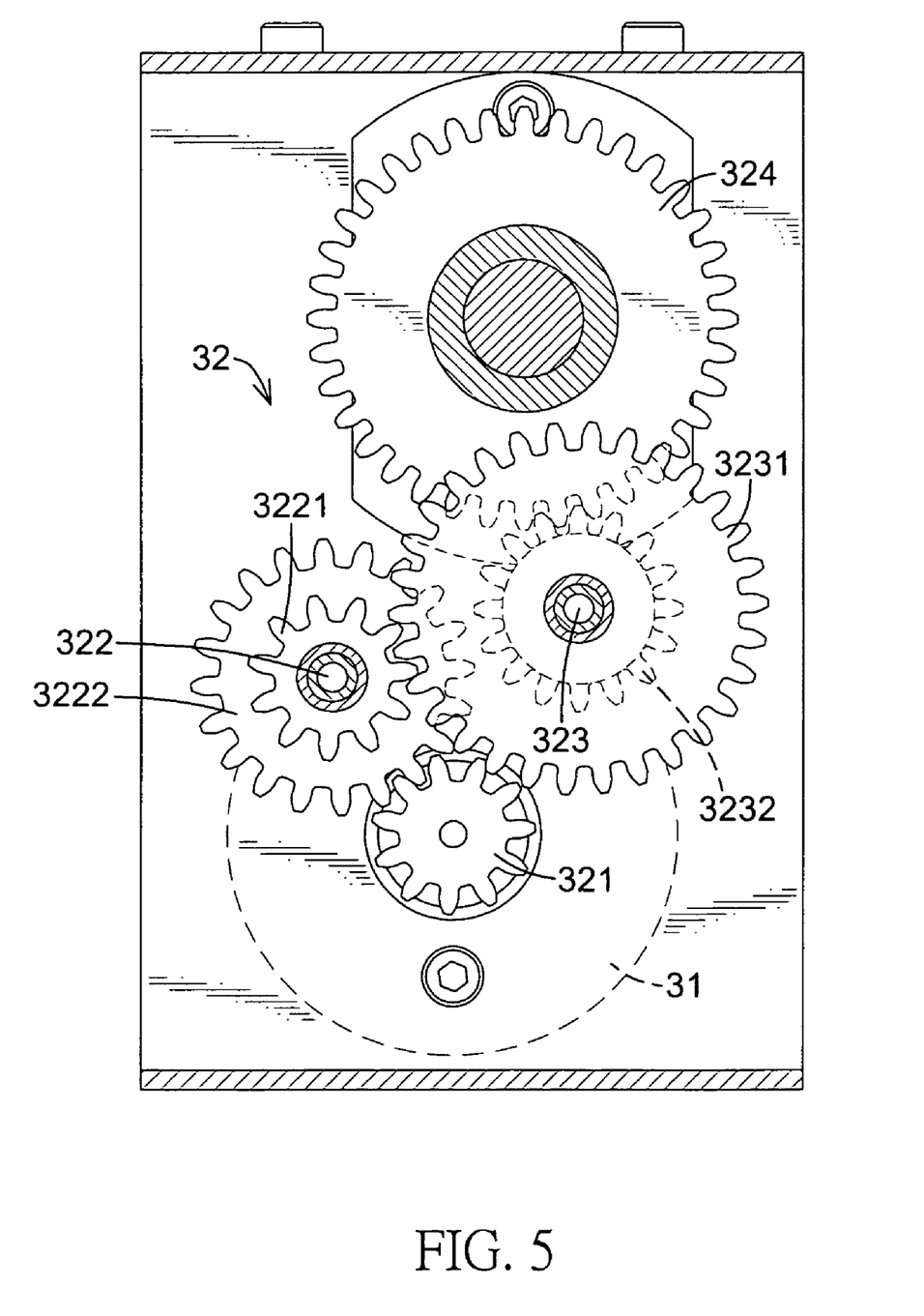
FIG. 5 is a front view in partial section of a gear reduction unit of the driving device for a parking brake system in FIG. 1.

With further reference to FIG. 5, the driving member (30) comprises a driving unit (31) and a gear reduction unit (32). The driving unit (31) drives the guide rod (21) to perform a longitudinal motion and may be a motor or a manual driving mechanism. The motor has an output shaft. The gear reduction unit (32) is connected to the output shaft of the motor and the inner threaded rod (25) to keep a rotation rate of the inner threaded rod (25) lower than that of the output shaft so as to raise the torque of the inner threaded rod. The gear reduction unit (30) may comprise a motor reduction gear (321), a first reduction shaft (322), a second reduction shaft (323) and a threaded rod reduction gear (324). The motor reduction gear (321) is mounted securely on the output shaft. The first reduction shaft (322) is mounted rotatably in the housing (10) and has a first front gear (3221) and a first rear gear (3222) engaging with the motor reduction gear (321). The second reduction shaft (323) is mounted rotatably in the housing (10) and has a second front gear (3231) engaging with the first front gear (3221) and a second rear gear (3232). The screw rod reduction gear (324) is mounted securely on the inner threaded rod (25) and engages with the second rear gear (3232). With the arrangement of the gear reduction unit (30), the rotation rate of the inner threaded rod (25) can be lowered to a suitable range.

Figure 6:
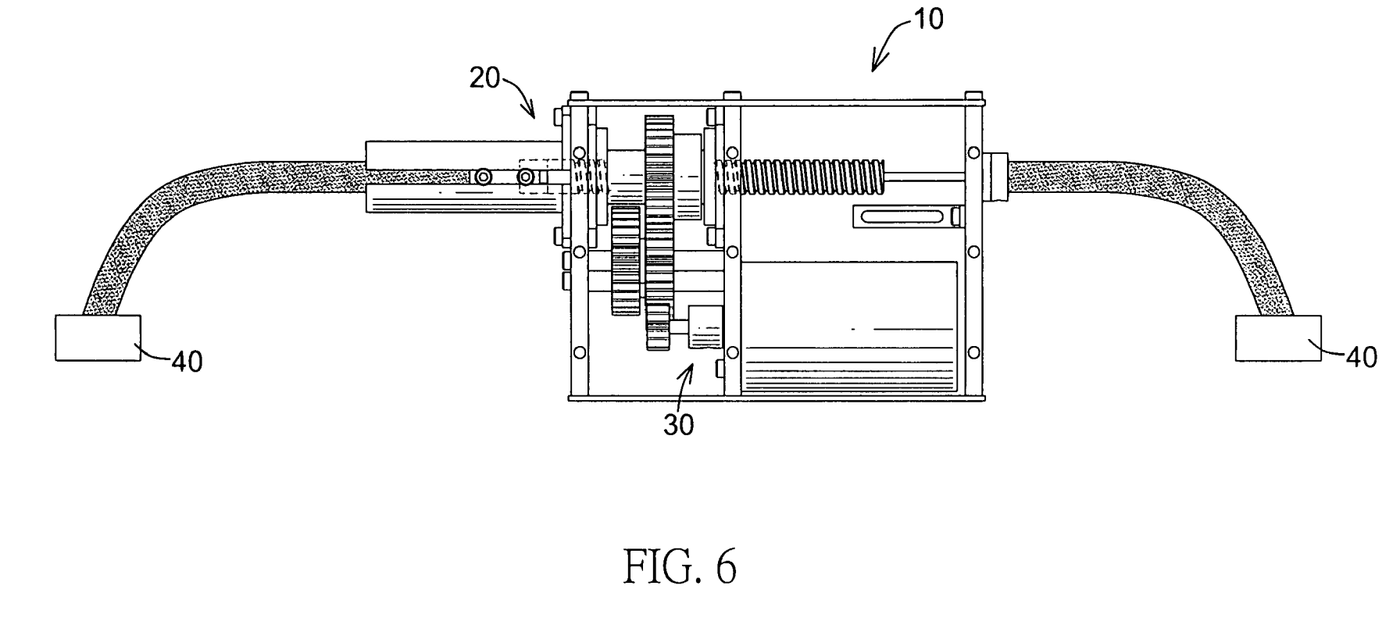
FIG. 6 is a side view of the driving device for a parking brake system in FIG. 1 when being connected to two brake mechanisms.

With reference to FIG. 6, when the driving device is in use, the brake cable (24) is connected to two brake mechanisms (40) such as rear drum brakes of a car. Then the motor is actuated to drive the inner threaded rod (25) to rotate with the transmission of the gear reduction unit (32). Therefore, the guide rod (21) engaging with the inner threaded rod (25) is forced to perform a longitudinal motion with the engagement of the threads on the rods (21,25).

Figure 7:
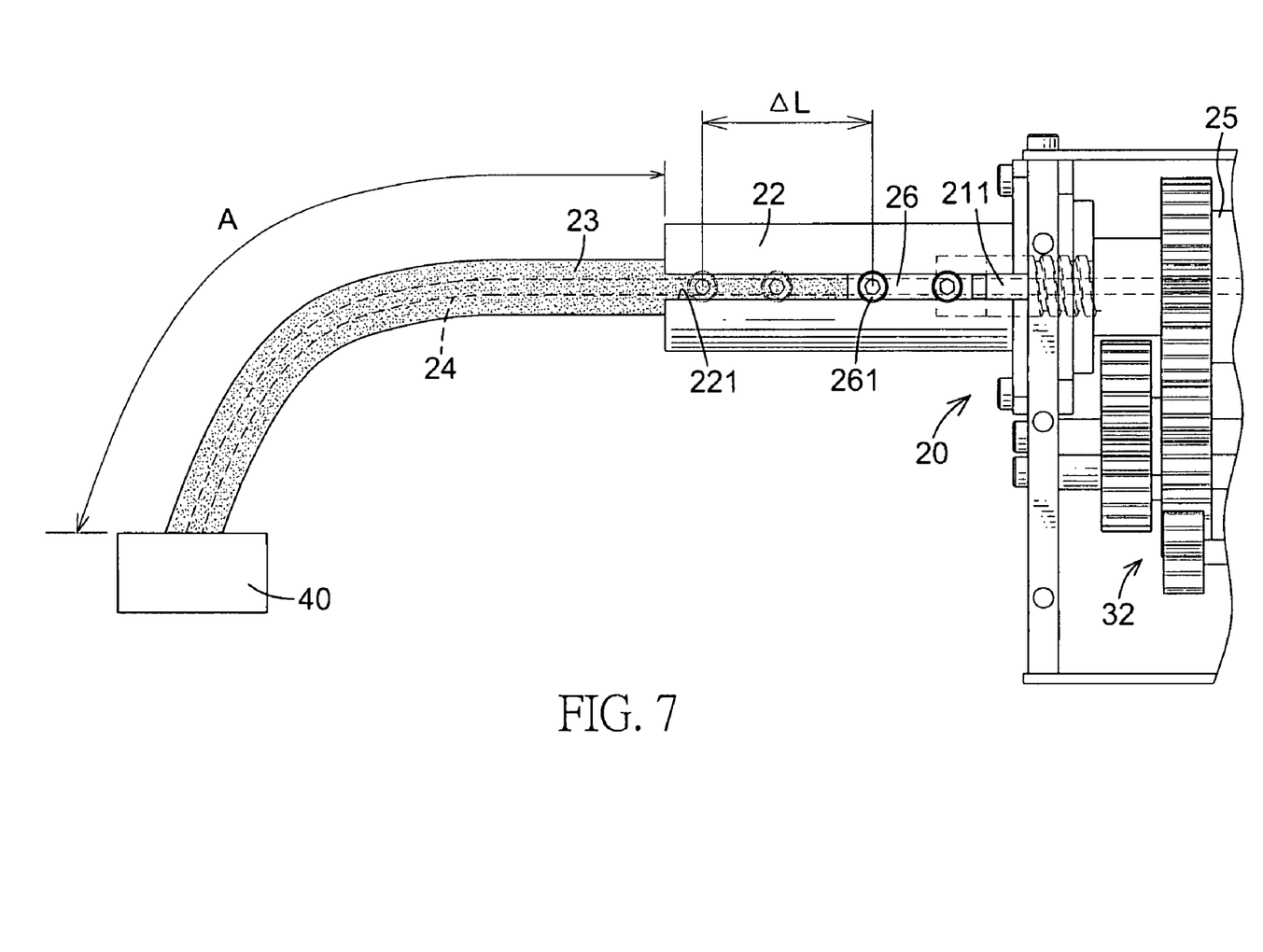
FIG. 7 is an enlarged side view of the driving device for a parking brake system in FIG. 6 with a brake cable being loosened.

With further reference to FIG. 7, before the motor is switched on, that's to say the braking work is disable, a length of a portion of the first cable casing (23) outside the guide tube (22) is A and the first cable casing (23) does not apply a force on the brake cable (24). So the brake cable (24) is under a loose condition.

Figure 8:
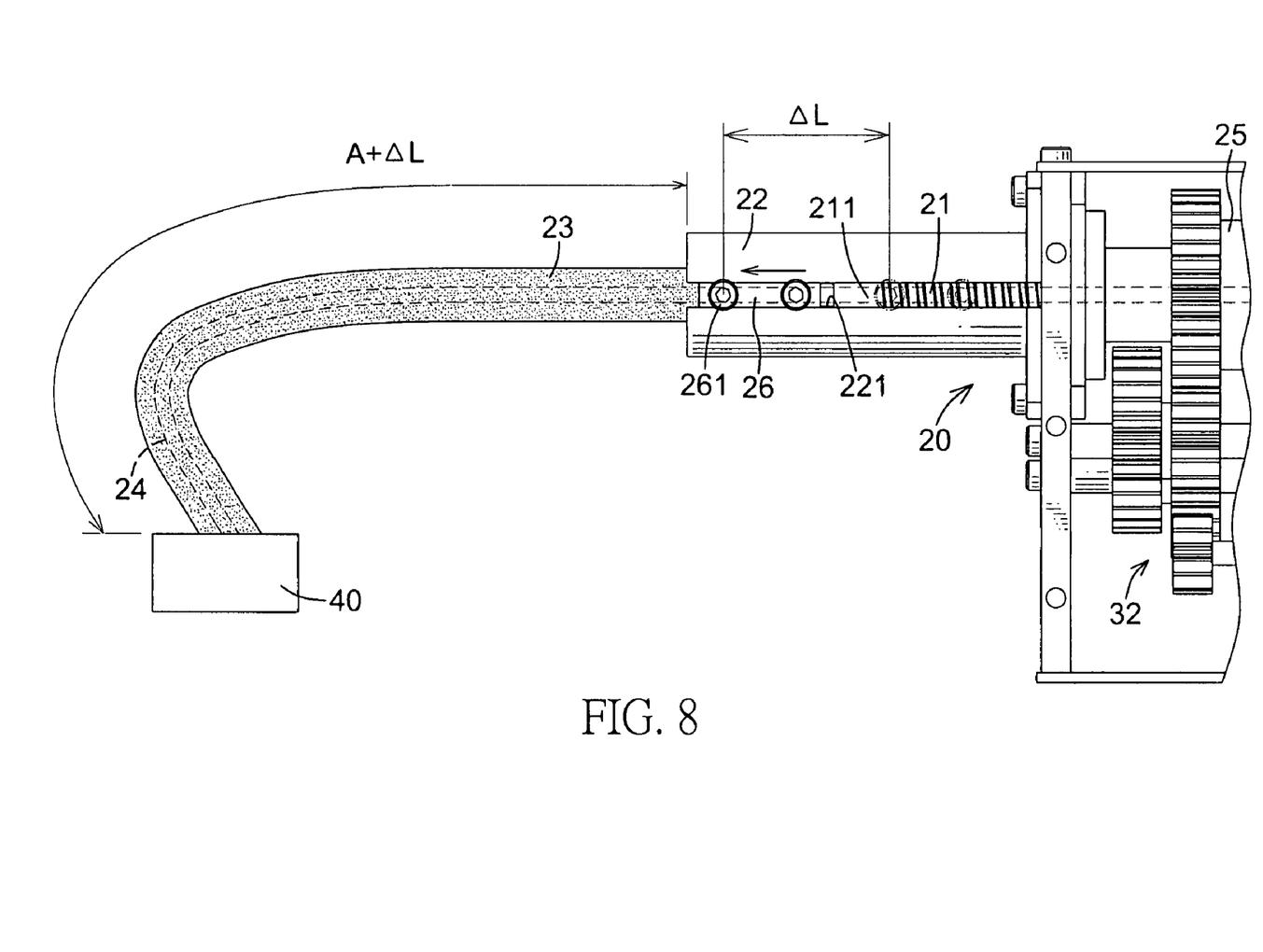
FIG. 8 is an enlarged side view of the driving device for a parking brake system in FIG. 6 with the brake cable being tightened.

With further reference to FIG. 8, when the motor drives the parking brake system to perform a braking work, the guide rod (21) performs an outward longitudinal motion for a distance of $\Delta L$. Therefore, the first cable casing (23) is also forced to move for a distance of $\Delta L$ and the length of the portion of the first cable casing (23) outside the guide tube (22) increases to $A+\Delta L$. Accordingly, the first cable casing (23) applies a force on and tightens the brake cable (24) having a constant length. The brake mechanisms (40) connected to the brake cable (24) are actuated to perform the brake work. When the guide rod (21) performs an inward longitudinal motion, the first cable casing (23) is forced back to an original position and the brake cable (24) is loosened. Thus, the brake cable (24) can be tightened or loosened with the motor turning in two directions.

Because the brake cable (24) is tightened with the force applied by the first cable casing (23), the brake cable (24) is only bent slightly. That prevents the brake cable (24) from being damaged easily and prolongs a life span of the brake cable (24). Additionally, a mechanical efficiency of the driving device is improved because the brake cable (24) is tightened with the brake cable (24) being slightly bent.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A driving device for a parking brake system comprising
a housing;
a casing shift member at least comprising
a cable casing having two ends;
a guide rod being mounted movably in the housing, being connected to the cable casing and having a protruding end;

a guide tube connected to the housing, mounted around the protruding end of the guide rod and having a longitudinal slot; and a slide sleeve mounted in the guide tube, fastened on the guide rod and one of the ends of the cable casing and having at least one guide pin mounted slidably in the longitudinal slot;

a brake cable being mounted through the cable casing; and a driving member comprising a driving unit connected to and driving the casing shift member to perform a longitudinal motion;

whereby the cable casing applies a force on the brake cable so as to perform a brake work.

2. The driving device for a parking brake system as claimed in claim 1, wherein the driving unit is a motor having an output shaft; and the driving member further comprises a gear reduction unit connected to the output shaft of the motor and the casing shift member.

3. The driving device for a parking brake system as claimed in claim 2, wherein the gear reduction unit comprises a motor reduction gear being mounted securely on the output shaft;

a first reduction shaft being mounted rotatably in the housing and having
a first front gear; and
a first rear gear engaging with the motor reduction gear;

a second reduction shaft being mounted rotatably in the housing and having
a second front gear engaging with the first front gear; and
a second rear gear; and a screw rod reduction gear being mounted securely on the casing shift member and engaging with the second rear gear.

4. The driving device for a parking brake system as claimed in claim 3, wherein the casing shift member further comprises another cable casing mounted on the housing at a side opposite to the cable casing and mounted around the brake cable.

5. The driving device for a parking brake system as claimed in claim 2, wherein the casing shift member further comprises an inner threaded rod mounted rotatably in the housing, connected to the gear reduction unit and having an inner thread; and the guide rod is mounted through the inner threaded rod and has an outer thread engaging with the inner thread of the inner threaded rod.

6. The driving device for a parking brake system as claimed in claim 3, wherein the casing shift member further comprises an inner threaded rod mounted rotatably in the housing, connected to the screw rod reduction and having an inner thread; and the guide rod is mounted through the inner threaded rod and has an outer thread engaging with the inner thread of the inner threaded rod.

7. The driving device for a parking brake system as claimed in claim 4, wherein the casing shift member further comprises an inner threaded rod mounted rotatably in the housing, connected to the screw rod reduction and having an inner thread; and the guide rod is mounted through the inner threaded rod and has an outer thread engaging with the inner thread of the inner threaded rod.

8. The driving device for a parking brake system as claimed in claim 1, wherein the casing shift member further comprises an inner threaded rod mounted rotatably in the housing and having an inner thread; and the guide rod is mounted through the inner threaded rod and has an outer thread engaging with the inner thread of the inner threaded rod.

9. A driving device for a parking brake system comprising
a housing;
a casing shift member at least comprising
a cable casing having two ends;
an inner threaded rod mounted rotatably in the housing and having an inner thread;
a guide rod being mounted movably in the housing, being connected to the cable casing, mounted through the inner threaded rod and having
a protruding end; and
an outer thread engaging with the inner thread of the inner threaded rod;
a guide tube connected to the housing, mounted around the protruding end of the guide rod and having a longitudinal slot;
a slide sleeve mounted in the guide tube, fastened on the guide rod and one of the ends of the cable casing and having at least one guide pin mounted slidably in the longitudinal slot; and
a brake cable being mounted through the cable casing; and
a driving member comprising
a driving unit being a motor, connected to and driving the casing shift member to perform a longitudinal motion, and having an output shaft; and
a gear reduction unit connected to the output shaft of the motor and the inner threaded rod and having .
a motor reduction gear being mounted securely on the output shaft;
a first reduction shaft being mounted rotatably in the housing and having
a first front gear; and
a first rear gear engaging with the motor reduction gear;
a second reduction shaft being mounted rotatably in the housing and having
a second front gear engaging with the first front gear; and
a second rear gear; and
a screw rod reduction gear being mounted securely on the inner threaded rod and engaging with the second rear gear;
whereby the cable casing applies a force on the brake cable so as to perform a brake work.

* * * * *